(12) United States Patent
Hofmann et al.

(10) Patent No.: US 7,419,720 B2
(45) Date of Patent: Sep. 2, 2008

(54) CONDUCTIVE PLASTIC MOLDING MATERIAL, THE USE THEREOF AND MOULDED BODIES PRODUCED THEREFROM

(75) Inventors: Achim Hofmann, Rimbach (DE); Hans-Gerhard Fritz, Uhingen (DE); Ralf Kaiser, Stuttgart (DE)

(73) Assignee: TICONA GmbH (DE)

( * ) Notice: Subject to any disclaimer, the term of this patent is extended or adjusted under 35 U.S.C. 154(b) by 483 days.

(21) Appl. No.: 10/471,469

(22) PCT Filed: Jan. 30, 2002

(86) PCT No.: PCT/EP02/00936

§ 371 (c)(1),
(2), (4) Date: Dec. 2, 2003

(87) PCT Pub. No.: WO02/072669

PCT Pub. Date: Sep. 19, 2002

(65) Prior Publication Data

US 2004/0119056 A1 Jun. 24, 2004

(30) Foreign Application Priority Data

Mar. 13, 2001 (DE) ............... 101 12 394

(51) Int. Cl.
  H01B 1/14 (2006.01)
  H01M 6/48 (2006.01)
  H01M 8/10 (2006.01)
  H01M 8/24 (2006.01)
  B29C 45/00 (2006.01)

(52) U.S. Cl. ............ 428/379; 252/511; 252/502; 252/506; 264/257; 264/328.17; 429/34; 429/39; 429/210; 429/218.1; 429/247; 429/251; 524/495; 524/496; 428/367; 428/357; 428/381

(58) Field of Classification Search ............ 252/500, 252/502, 511, 514; 264/449, 464, 478, 257, 264/328.17; 429/30, 33, 34, 210, 218.1; 524/495, 439
See application file for complete search history.

(56) References Cited

U.S. PATENT DOCUMENTS

| | | | | |
|---|---|---|---|---|
| 4,689,179 A | * | 8/1987 | Kaieda et al. ............ | 552/263 |
| 4,772,422 A | * | 9/1988 | Hijikata et al. ............ | 252/511 |
| 4,772,442 A | | 9/1988 | Trout et al. | |
| 4,824,871 A | * | 4/1989 | Shinomura ............ | 521/53 |
| 4,909,961 A | | 3/1990 | Suzuki et al. | |
| 4,971,726 A | * | 11/1990 | Maeno et al. ............ | 252/511 |
| 4,985,175 A | | 1/1991 | Dziurla et al. | |
| 5,093,035 A | | 3/1992 | Dziurla et al. | |
| 5,173,684 A | * | 12/1992 | Ijiri et al. ............ | 340/605 |
| 5,428,100 A | * | 6/1995 | Asai et al. ............ | 524/496 |
| 6,103,413 A | * | 8/2000 | Hinton et al. ............ | 429/32 |
| 6,180,275 B1 | * | 1/2001 | Braun et al. ............ | 429/34 |
| 6,379,795 B1 | * | 4/2002 | Bisaria et al. ............ | 428/378 |
| 2002/0028368 A1 | * | 3/2002 | Saito et al. ............ | 429/34 |

FOREIGN PATENT DOCUMENTS

| | | | |
|---|---|---|---|
| EP | 328964 | | 2/1989 |
| EP | 0 355 615 | | 8/1989 |
| EP | 0 351 660 | | 1/1990 |
| EP | 0 437 851 | | 7/1991 |
| EP | 953 606 | | 11/1999 |
| JP | 64-011161 | * | 1/1989 |
| JP | 437851 | * | 7/1991 |
| JP | 07-286103 | * | 10/1995 |
| JP | 953606 | * | 8/1997 |
| JP | 2000-017179 | * | 1/2000 |
| JP | 2001-122677 | * | 5/2001 |
| WO | WO 00/44005 | * | 7/2000 |
| WO | WO-00/44005 | | 7/2000 |

OTHER PUBLICATIONS

Cabot Corp., "Vulcan XC72" MSDS, Cabot Corp., 2002.
"Ketjenblack EC-300J" MSDS, Akzo Nobel, Apr. 2005.
"Ketjenblack EC-600 JD" MSDS, Akzo Nobel, Nov. 2006.
J. D. van Drumpt, "Developments in Conductive Carbon Blacks," *Plastics Compounding*, Mar./Apr. 1988, pp. 37-44.
Julia A. King et al., "Conductive Nylon 6,6 and High Temperature Nylon," Michigan Technology Univ. 1988.
Cabot Corp., "Vulcan XC72" MSDS, Cabot Corp., 2002.
"Ketjenblack EC-300J" MSDS, Akzo Nobel, Apr. 2005.
"Ketjenblack EC-600 JD" MSDS, Akzo Nobel, Nov. 2006.
Matthew Lee Clingerman, "Development and Modelling of Electrically Conductive Composite Materials," Michigan Technological Univ., 2001.

(Continued)

*Primary Examiner*—Stanley Silverman
*Assistant Examiner*—Kallambella Vijayakumar
(74) *Attorney, Agent, or Firm*—Connolly Bove Lodge & Hutz LLP

(57) ABSTRACT

The present invention relates to a plastics molding composition based on polyarylene sulfide and/or on liquid-crystalline plastic, where the molding composition comprises carbon black and graphite and/or metal powder, the carbon black has a specific surface area of from 500 to 1500 m²/g, and a dibutyl phthalate value of from 100 to 700 ml/100 g, and the graphite has a specific surface area of from 1 to 35 m²/g. The molding compositions of the invention have good conductivities, and better flowabilities and mechanical properties.

9 Claims, 10 Drawing Sheets

OTHER PUBLICATIONS

Figure 1:
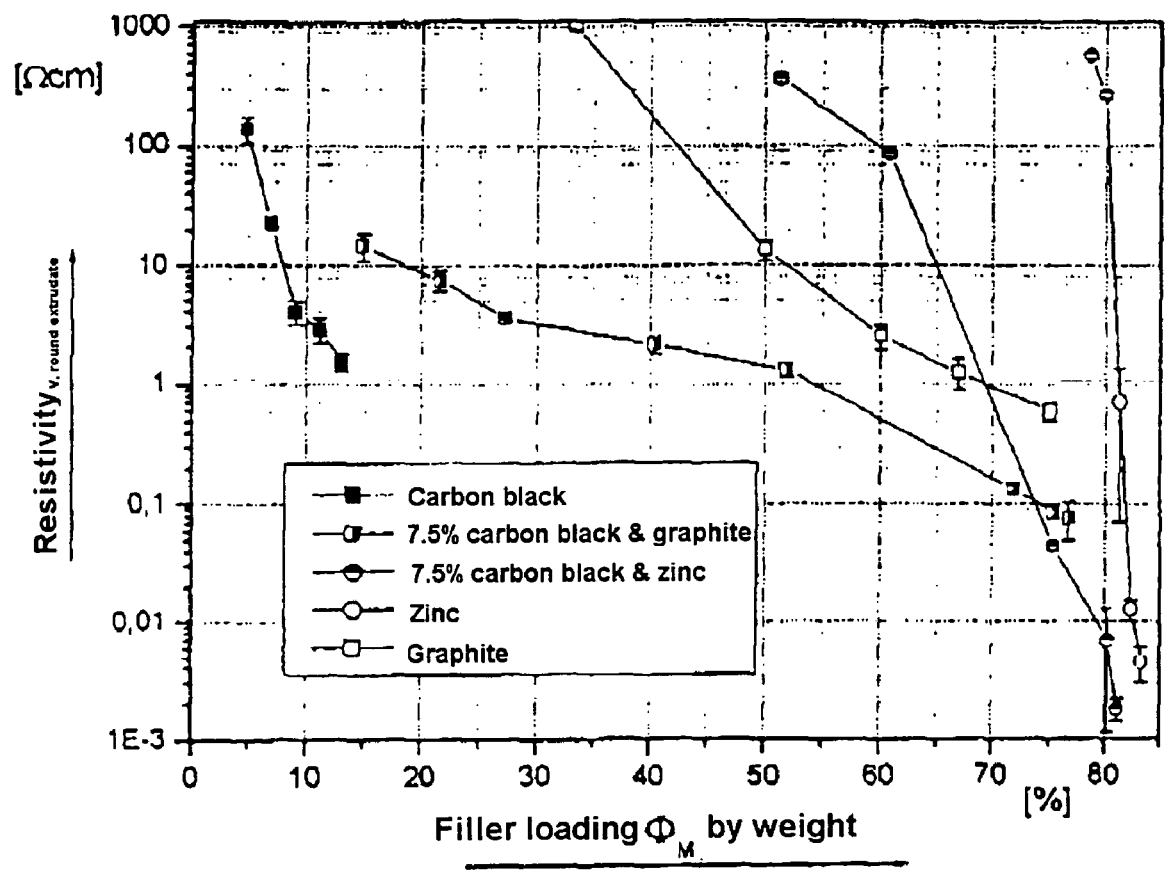

J. D. van Drumpt, "Developments in Conductive Carbon Blacks," *Plastic Compounding*, Mar./Apr. 1988, pp. 37-44.

Julia A. King et al., "Conductive High Temperature Nylon," *Journal of Composite Materials*, vol. 34, No. 24/2000 Oct. 20, 1998, pp. 2038-2059.

Ernest W. Flick, *Plastics Additives, An Industrial Guide*, 2d., Noyes Publications, 1993. pp. 475-532.

Specialty Blacks: Typical Properties;, Phillips Petroleum, Jan. 1985.

George Wypych, Handbook of filters 2 nd edition 1999 pp. 62 and 92.

Statutory Declaration from Henk Vinke filed in opposition for European counterpart.

Statutory Declaration from Julia King filed in opposition for European counterpart.

* cited by examiner

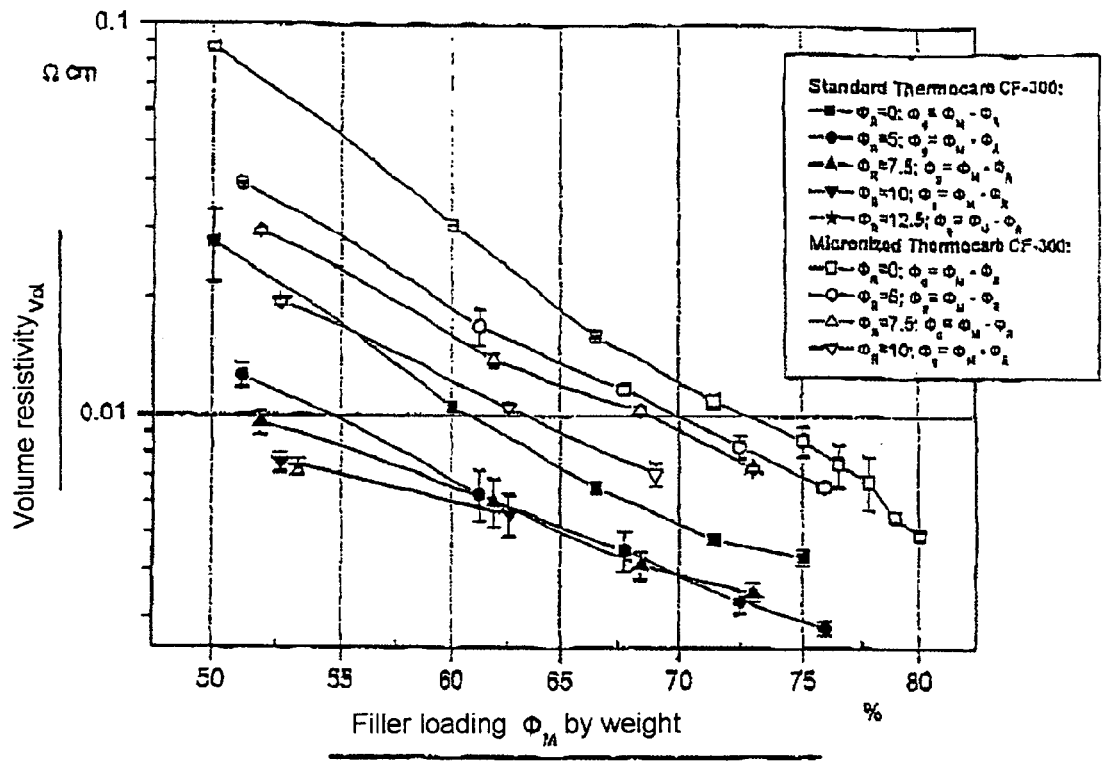
Figure 5: Volume resistivity as a function of median particle size
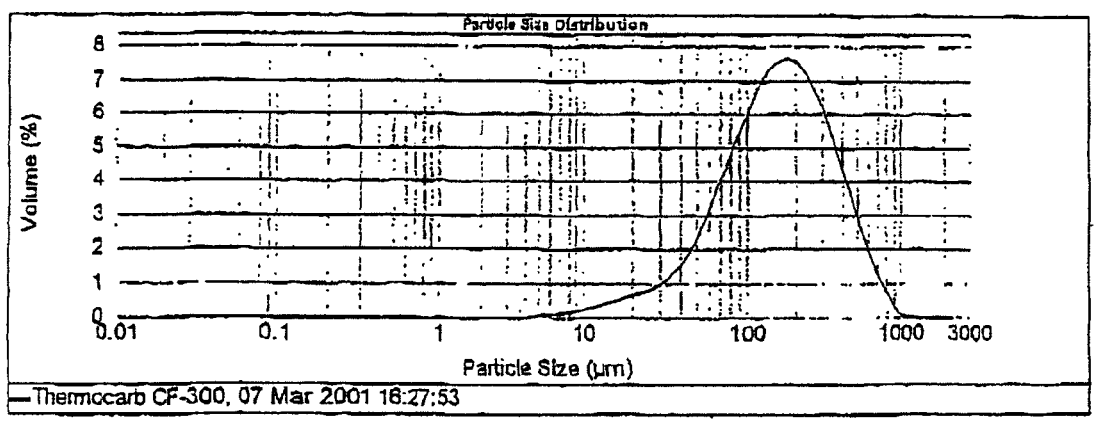
Figure 6: Particle size profile for standard graphite CF-300

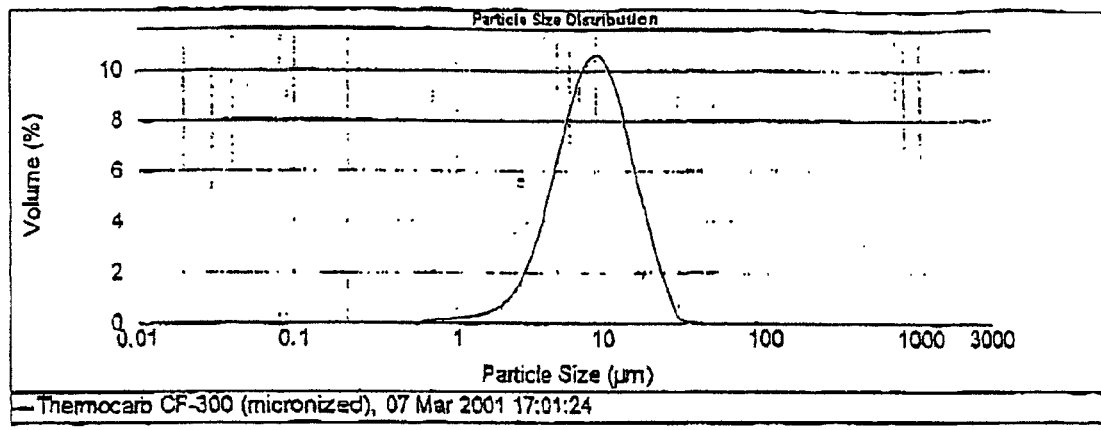
Figure 7: Particle size profile for micronized graphite CF-300
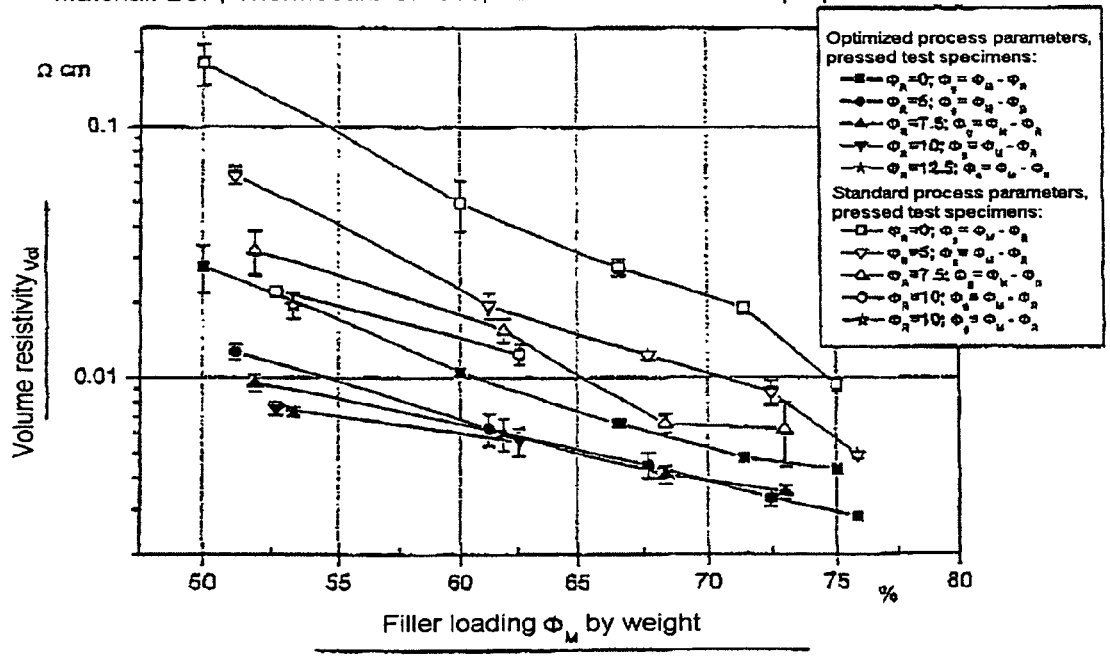
Figure 8

CONDUCTIVE PLASTIC MOLDING MATERIAL, THE USE THEREOF AND MOULDED BODIES PRODUCED THEREFROM

DESCRIPTION

The present invention relates to conductive plastics molding compositions, in particular high-conductivity plastics molding compositions with intrinsic resistivity RD of less than 10 Ωcm, using liquid-crystalline plastic or polyphenylene sulfide as matrix polymers. Since there is increasingly a shortage of non-renewable energy sources, there is interest in research into fuel cells. Until now, one of the most costly parts of a fuel cell has been the bipolar plate.

Currently, V2A and V4A steels are used to produce the bipolar plates. The disadvantages here are high material costs, difficulties in working the material, corrosion resistance, which is frequently inadequate, and also high weight, since densities are in the range 7-8 g/ml.

Although aluminum is lighter, with densities in the region of 2.7 g/ml, it is likewise costly and forms oxide layers which increase surface resistance.

The density of graphite is 2.24 g/ml, but its mechanical stability is low, and it is therefore impossible to achieve the desired reduction in thickness. In addition, other problems arise due to gas permeation into the layer lattice structure.

Graphite/polymer composites based on thermoset resin, for example, have been developed in order to overcome these disadvantages. U.S. Pat. No. 4,339,322 discloses compounds based on fluorinated and partially fluorinated polymers. However, disadvantages here are the lack of recyclability, and high cycle times in production.

It is known that the structure of carbon black/polymer compounds, even at from 5 to 20 percent by weight carbon black content, gives them boundary conductivities of about 10 S/cm. However, a disadvantage of these molding compositions is their poor flowability, which adversely affects processability.

WO 00/30202 describes a carbon-containing compound based on polyphenylene sulfide or on liquid-crystalline plastic. Here, carbon powder and carbon fibers are used in combination.

It is an object of the present invention to use simple measures to overcome the disadvantages of the prior art. This object is achieved by means of a plastics molding composition based on polyarylene sulfide and/or on liquid-crystalline plastic, where the compound comprises carbon black and graphite and/or metal powder, the carbon black has a specific surface area of from 500 to 1500 m²/g, and a dibutyl phthalate value of from 100 to 700 ml/100 g, and the graphite has a specific surface area of from 1 to 35 m²/g.

The filler contents φM by weight of the molding compositions of the invention are non-zero and less than 85, preferably less than or equal to 80, and particularly preferably in the range from 60 to 80.

The molding compositions of the invention may advantageously also comprise lubricants with internal or external lubricant action, and these may also be removed after the compounding process.

Surprisingly, it has been found that an unexpected synergistic effect occurs in the molding composition of the invention, due to the use of carbon black together with graphite and/or metal powder.

Compared with conventional carbon black compounds, the molding compositions of the invention have better electrical conductivities and thermal conductivities, together with improved flowability and improved mechanical properties.

Compared with graphite compounds, the molding compositions of the invention have the same electrical conductivity and similar thermal conductivity, together with reduced density and higher strength.

The carbon black used may be a conductivity black with a specific surface area of from 500 to 1500 m²/g, advantageously from 800 to 1250 m²/g. The carbon blacks suitable according to the invention moreover have a dibutyl phthalate value of from 100 to 700 ml/100 g, advantageously from 200 to 700 ml/100 g, particularly advantageously from 300 to 520 ml/100 g, in particular in the range from 300 to 345 ml/100 g or 470 to 520 ml/100 g. The particle sizes of the carbon blacks in the polymer matrix of the molding composition are in the range from 0.01 to 2 µm, advantageously in the range from 0.05 to 0.15 µm. The primary particle size is in the range from 0.02 to 0.05 µm. The carbon blacks used have agglomerate particle sizes of from 10-50 µm, densities of from 0.1 to 1.6 g/ml, electrical resistivities in the range from 10 to $80*10^{-4}$ Ωcm, advantageously from 30 to $50*10^{-4}$ Ωcm, in particular $40*10^{-4}$ Ωcm, and low thermal conductivities of less than 0.15 W/mK, in particular 0.07 W/mK. The electrical conductivities as a function of filler content (the shape of the percolation curve) can be modified via the structure of the carbon black in the matrix, and the skilled worker can therefore easily control and optimize the product properties by using changes in the shear energy introduced and in the residence time.

The graphite used according to the invention is a graphite with no strongly developed structure. The specific surface area of the graphite is from 1 to 35 m²/g, advantageously from 2 to 20 m²/g, particularly advantageously from 3 to 10 m²/g. The particle size of the graphite used is from 1 to 1100 µm, with a median particle size of from 50 to 450 µm. The particle size is advantageously in the range from 10 to 1000 µm, particularly advantageously from 10 to 800 µm, very particularly advantageously from 10 to 500 µm. The median particle size is advantageously in the range from 100 to 300 µm, and is particularly advantageously 200 µm. The numbers given here are uncorrected values, and have to be corrected upward or downward using the tolerances of the test methods used. The graphite used moreover has high thermal conductivities above 100 W/mK, advantageously above 180 W/mK, particularly advantageously above 200 W/mK. The electrical resistivities are generally from 5 to $15*10^{-4}$ Ωcm, advantageously below $10*10^{-4}$ Ωcm, in particular about $8*10^{-4}$ Ωcm.

The metal powder used may in principle be any of the metal powders with a defined particle size and particle distribution.

The metal powder used advantageously has an apparent density to ISO 3923/1 of from 1 to 4 g/ml, advantageously from 2.7 to 3.2 g/ml, particularly advantageously from 2.8 to 3.1 g/ml.

The metal powder used has a fraction of 5% by weight, advantageously from 4 to 1% by weight, particularly advantageously below 1% by weight, in particular 0.8% by weight, with particle sizes up to 45 µm. The proportion of particle sizes greater than 45 µm is more than 95% by weight, advantageously from 96 to 99% by weight, particularly advantageously above 99% by weight, in particular 99.2% by weight. Examples of metal powders which may advantageously be used are aluminum, chromium, iron, gold, iridium, cobalt, copper, magnesium, manganese, molybdenum, nickel, niobium, osmium, palladium, platinum, rhenium, rhodium, samarium, silver, titanium, vanadium, bismuth, tungsten, zinc, tin, alloys or mixtures made from two or more of these metals, and include mixtures and/or alloys which are liquid under the conditions of processing. Alloys which may be mentioned here, merely by way of example, are brass, steel, V2A steel and V4A steel.

According to the invention it is possible to use the polyarylene sulfides known per se. Suitable materials are described, by way of example, in Saechtling, Kunststoff-Taschenbuch [Plastics handbook], Hanser-Verlag, 27th-edition, on pages 495-498, and this citation is incorporated herein by way of reference. It is advantageous to use thermoplastic polyarylene sulfides. Polyphenylene sulfide, PPS, is particularly advantageous.

Polyarylene sulfides may be prepared using dihalogenated aromatic compounds. Preferred dihalogenated aromatic compounds are p-dichlorobenzene, m-dichlorobenzene, 2,5-dichlorotoluene, p-dibromobenzene, 1,4-dichloronaphthalene, 1-methoxy-2,5-dichlorobenzene, 4,4'-dichlorobiphenyl, 3,5-dichlorobenzoic acid, 4,4'-dichlorodiphenyl ether, 4,4'-dichlorodiphenyl sulfone, 4,4'-dichlorodiphenyl sulfoxide, and 4,4'-dichlorodiphenyl ketone. It is also possible to use small amounts of other halogenated compounds, such as trihalogenated aromatics, in order to exert a specific effect on the properties of the polymer.

According to the invention, the polyarylene sulfide used preferably comprises polyphenylene sulfide. Polyphenylene sulfide (PPS) is a semicrystalline polymer with the general formula:

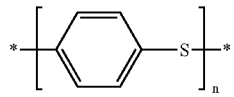

where n>1, and where the molar mass ($M_w$) of the polymer is above 200 g/mol.

According to the invention, use may also be made of the liquid-crystalline plastics (LCPs) known per se. There are no restrictions on the type of materials used, but advantageous materials are those which are capable of thermoplastic processing. Particularly suitable materials are described, by way of example, in Saechtling, Kunststoff-Taschenbuch, Hanser-Verlag, 27th edition, on pages 517-521, and this citation is incorporated herein by way of reference. Materials which may be used advantageously are polyterephthalates, polyisophthalates, PET-LCP, PBT-LCP, poly(m-phenyleneisophthalamide), PMPI-LCP, poly(p-phenylenephthalimide), PPTA-LCP, polyarylates, PAR-LCP, polyester carbonates, PEC-LCP, polyazomethines, polythioesters, polyesteramides, polyesterimides. Particularly advantageous materials are p-hydroxybenzoic-acid-based liquid-crystalline plastics, such as copolyesters or copolyesteramides. Liquid-crystalline plastics whose use is very particularly advantageous are generally polyesters which are fully aromatic and form anisotropic melts and which have average molar masses ($M_w$=weight-average) of from 2000 to 200000 g/mol, preferably from 3500 to 50000 g/mol, and in particular from 4000 to 30000 g/mol. A suitable group of liquid-crystalline polymers is described in U.S. Pat. No. 4,161,470, which is incorporated herein by way of reference. These are naphthoyl copolyesters with repeat structural units of the formulae I and II

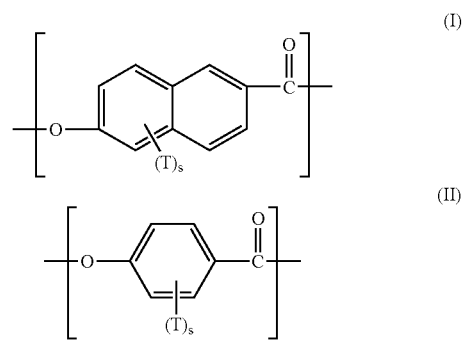

where the T selected is an alkyl radical, an alkoxy radical, in each case having from 1 to 4 carbon atoms, or a halogen, preferably chlorine, bromine or fluorine, and s is zero or an integer 1, 2, 3 or 4, and if there is more than one radical T these are independent of one another and identical or different. The naphthoyl copolyesters contain from 10 to 90 mol %, preferably from 25 to 45 mol %, of structural units of the formula I, and from 90 to 10 mol %, preferably from 85 to 55 mol %, of structural units of the formula II, where the proportions of structural units of the formulae I and II together give 100 mol %.

EP-A-0 278 066—and U.S. Pat. No. 3,637,595, which are incorporated herein by way of reference, describe other liquid-crystalline polyesters suitable for the molding compositions of the invention, and mention oxybenzoylcopolyesters containing structural units of the formulae III, IV and V, where one or more of the structural units specified may be present in each case.

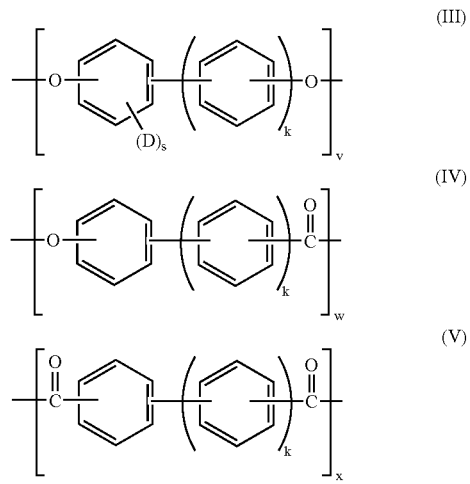

In the formula III, IV and V, k is zero or 1, v, w, and x are integers equal to or greater than 1, the D selected is an alkyl radical having from 1 to 4 carbon atoms, an aryl radical, an aralkyl radical having from 6 to 10 carbon atoms in each case, or a halogen, such as fluorine, chlorine or bromine, and s is as defined above, and if there is more than one radical D, these are independent of one another and identical or different. The total of the indices v, w and x is from 30 to 600. The oxybenzoylcopolyesters generally contain from 0.6 to 60 mol %, preferably from 8 to 48 mol %, of structural units of the formula II, from 0.4 to 98.5 mol %, preferably from 5 to 85 mol %, of structural units of the formula IV, and from 1 to 60 mol %, preferably from 8 to 48 mol %, of structural units of the formula V, where the proportions of the structural units of the formulae III, IV and V together give 100 mol %.

Other suitable copolyesters are those which contain only structural units of the formulae III and V. These liquid-crystalline polymers generally contain from 40 to 60 mol % of the structural units of the formula III, and from 60 to 40 mol % of structural units of the formula V. Preference is given here to a molar ratio of 1:1. Polyesters of this type are described, by way of example, in U.S. Pat. No. 4,600,765; U.S. Pat. No. 4,614,790 and U.S. Pat. No. 4,614,791, which are incorporated herein by way of reference.

Other suitable copolyesters are those which, besides the structural units selected from the formulae III to V, also contain those of the formulae I and/or II, e.g. with from 15 to 1 mol % of structural units of the formula I, from 50 to 79 mol % of those of formula II, from 20 to 10 mol % of those of formula III, and from 20 to 10 mol % of those of formula V.

Other liquid-crystalline plastics which can be used advantageously for the molding compositions of the invention are copolyesteramides which, besides one or more structural units of the formulae I to V, also have at least one structural unit of the formula VI or VII

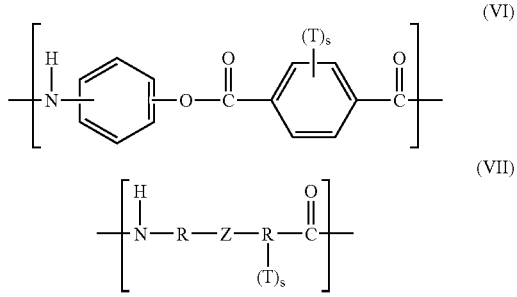

(VI)

(VII)

where R may be phenylene or naphthylene, Z may be a CO or O (oxygen) group, and T and s are as defined above. The liquid-crystalline plastics which are suitable may be used individually or as mixtures.

Other suitable liquid-crystalline plastics also contain, besides the structural units I to VII, at least one structural unit VIII

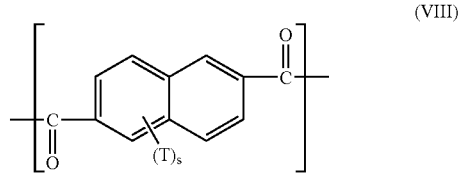

(VIII)

where T and s are as defined above.

Either the liquid-crystalline plastic or the polyarylene sulfide may comprise conventional additives and reinforcing materials, for example fibers, in particular glass fibers, carbon fibers, aramid fibers, mineral fibers, processing aids, polymeric lubricants, lubricants with external and/or internal lubricant action, ultrahigh-molecular-weight polyethylene (UHMWPE), polytetrafluoroethylene (PTFE) or a graft copolymer which is a product made from an olefin polymer and from an acrylonitrile-styrene copolymer in a graft reaction, antioxidants, adhesion promoters, waxes, nucleating agents, mold-release agents, glass beads, mineral fillers, such as chalk, calcium carbonate, wollastonite, silicon dioxide, talc, mica, montmorillonite, organically modified or unmodified, organically modified or unmodified phyllosilicates, materials forming nanocomposites with the liquid-crystalline plastic or with the polyarylene sulfide, or nylon nanocomposites, or mixtures of the abovementioned substances.

The lubricant used may be a mixture made from a lubricant with external lubricant action and from a lubricant with internal lubricant action. The mixing ratio of lubricant with internal lubricant action to lubricant with external lubricant action may be from 0:100 to 100:0 parts by weight. The lubricant used with predominantly external lubricant action may be solid and/or liquid paraffins, montanic esters, partially hydrolyzed montanic esters, stearic acids, polar and/or non-polar polyethylene waxes, poly-a-olefin oligomers, silicone oils, polyalkylene glycols or perfluoroalkyl ethers. Soaps and esters, including those partially hydrolyzed, are also lubricants with both external and internal lubricant action. Preference is given to the use of a high-molecular weight polyethylene wax which has been oxidized and is therefore polar. This improves tribological properties and permits a less pronounced fall-off in mechanical properties. Stearyl stearate is preferably used as lubricant with predominantly internal lubricant action. Paraffins, solid or liquid, stearic acids, polyethylene waxes, non-polar or polar, poly-α-olefin oligomers, silicone oils, polyakylene glycols and perfluoroalkyl ethers are lubricants with external lubricant action. Soaps and esters, including those partially hydrolyzed, are lubricants with both external and internal lubricant action. Montanic esters and partially hydrolyzed montanic esters are lubricants with external lubricant action.

The preferred oxidized polyethylene wax is a high-molecular-weight polar wax, and generally has an acid value of from 12 to 20 mg KOH/g, and a viscosity of from 3000 to 5000 mPa·s at 140° C.

Lubricants which should be mentioned with predominantly internal lubricant action are: fatty alcohols, dicarboxylic esters, fatty esters, fatty acids, fatty acid soaps, fatty amides, wax esters, and stearyl stearates, the last-named being preferred. Lubricants are described in Gächter and Müller, "Taschenbuch der Kunststoff-Additive" [Plastics additives handbook], 3rd edition, Carl Hanser Verlag, Munich/Vienna, 1994, pages 478-504, and this citation is incorporated herein by way of reference.

The molding compositions of the invention may be prepared and processed by the conventional processes for thermoplastics, such as kneading, extrusion, injection molding, transfer molding and compression molding.

The median particle dimensions of the graphite are decisive for developing good electrical conductivity in the component. In order to avoid excessive reduction of these particle dimensions by high shear forces, it is necessary to use particularly non-aggressive preparation and shaping processes. As stated above, use is made of graphite types with a median particle size in the range from 50 to 450 μm, advantageously in the range from 100 to 300 μm, particularly advantageously of 200 μm, incorporated into the matrix polymers of the invention using a filler content of below 85% by weight, advantageously of below or equal to 80% by weight, particularly advantageously from 60 to 80% by weight.

In relation to the properties of the final product, it has proven particularly advantageous to use processes in which the preparation and shaping step have been combined to give a single-stage process. Examples of this are injection molding-compounding with or without an injection-compression molding unit and the melt-application compression-molding process, which is based on the combination of a preparation assembly (single-screw, twin-screw or the like) and a compression-molding unit. All of these single-stage processes are processes well-known in the art or are otherwise known from the literature.

Injection molding-compounding without injection-compression molding unit: see R. Jensen: Synergien intelligent nutzen—IMC-Spritzgiesscompounder erhoht Wertschöpfung [Intelligent utilization of synergies—IMC Injection-molding compounder increases value-added]; Kunststoffe plast europe, 9/2001; and also R. Jensen: Synergie schafft neue Technologie [Synergy creates new technology]; Kunststoffe plast europe 10/2001, incorporated herein by way of reference.

Injection-molding compounding with injection-compression molding unit (known as injection-compression molding): see F. Johannaber, W. Michaeli: Handbuch Spritzgiessen [Injection molding handbook], Carl Hanser-Verlag, Munich (2001), ISBN 3-446-15632-1, p. 417; and also H. Saechtling:

Kunststofftaschenbuch [Plastics handbook], 27th edition, Carl Hanser-Verlag, Munich (1998), ISBN 3446-19054-6, p. 226, incorporated herein by way of reference.

Melt-application compression molding: T. Hofer: Fillflow—A comparison between simulation and experiment in the case of the extrusion compression moulding. Proceedings of the 3rd ESAFORM Conference on Material Forming, Stuttgart (2000); ISBN 3-00-005861-3; and also R. D. Krause, Dissertation, Stuttgart University, Process Technology Faculty, Institut Kunststofftechnologie [Institute for Plastics Technology] (1998); Modellierung und Simulation rheologisch-thermodynamischer Vorgange bei der Herstellung grossflatchiger thermoplastischer Formteile mittels Kompressionsformverfahren [Modeling and simulation of rheological-thermodynamic processes during the production of large-surface area thermoplastic moldings by compression-molding processes], incorporated herein by way of reference.

In particular, the use of an injection-molding compounder (IMC) proves advantageous, because preparation and shaping of the filled system take place in one step, without reheating. If, in addition, an injection-compression molding unit or compression molding unit is utilized, the damage to particles is dramatically reduced when comparison is made with simple injection molding. This damage to particles, brought about by attack by high shear stresses and deformation rates during injection into the mold cavity at high injection rates reduces component conductivity significantly by factors of from 3 to 10. Use of the injection-compression molding unit permits non-aggressive injection of a shot of melt within the cavity, and permits the final shaping of the component to be brought about by fully closing the cavity.

However, another process which has proven particularly advantageous is shaping via compression, using a compression mold (positive mold), the process known as compression molding, this likewise being a process well-known in the prior art, and widely known from the literature.

Compression molding: Kunststofflaschenbuch [Plastics handbook], 25th edition, Carl Hanser-Verlag, Munich (1998), ISBN 3-446-16498-7, pp. 113 et seq., incorporated herein by way of reference.

It has proven particularly advantageous here for the molding compositions of the invention to be pre-ground, e.g. on a grinder, or jaw crusher, or in a ball mill or pinned disc mill, after the preparation step and before the compression molding process.

Particle sizes of from 1500 to 50 μm, preferably from 1000 to 100 μm, and particularly preferably from 800 to 150 μm, for the pre-ground molding compositions are particularly advantageous for shaping via compression molding.

The molding compositions of the invention may be used in any of the sectors where there is a need for conductive plastics. The molding compositions of the invention may be used advantageously for parts of fuel cells, in particular parts of end plates of a fuel cell, or for end plates or bipolar plates of fuel cells. The bipolar plates, end plates or parts of end plates produced from the molding compositions of the invention are suitable for producing high-output fuel cells with a specific output greater than one kilowatt per kilogram, and can achieve specific electrical conductivities above 100 S/cm, and are chemically resistant to all of the materials used in operating a fuel cell, for example mains water, demineralized water, acids, hydrogen, methanol, and are also impermeable to these. In this connection see also the German Patent Application with file reference No. 10064656.5-45. The heat distortion temperature of the molding compositions of the invention is above 130° C. at 1.82 MPa test load. Their flexural strength is from 30 to 50 MPa, and is therefore markedly above the minimum requirement of 20 MPa. Since it is possible to use conventional injection molding or injection-compression molding, and no machining is needed, high production rates can be achieved. By selecting suitable filler systems, it is possible to obtain components which have the same electrical properties but have from 10 to 23% reduction in the proportion of filler, and from 3 to 10% reduction in component density, while mechanical and rheological properties are improved. Components manufactured from the molding compositions of the invention are therefore particularly suitable for application in mobile fuel cells as well as for use in stationary fuel cells.

EXAMPLES

In the examples, molding compositions were prepared from liquid crystalline plastic (Vectra A 950, Ticona GmbH, Frankfurt). The carbon black used was Ketjenblack EC-600JD from Akzo Nobel, with a dibutyl phthalate value of from 480 to 150 ml/100 g, iodine absorption of from 1000 to 1150 mg/g, and apparent density of from 100 to 120 kg/m$^3$. This carbon black comprises 7% of particles of size below 125 μm. The graphite used was Thermocarb CF-300 from Conoco. The zinc powder used was a zinc powder from Eckart Dorn, which has a median particle size of 20 μm, apparent density of 3.06 g/ml, and 0.8% of particles of size below 45 μm (measured to ISO 4497). In the comparative examples, the filler loading is identical with the filling content. The carbon black content in carbon black/graphite mixtures or carbon black/zinc mixtures from Tables 1-5 was 7.5% by weight, and the filler loading was achieved by increasing the proportion of graphite or of zinc.

Table 1 lists the results of molding compositions prepared using a Buss Ko-Kneader (L/D=15), and the examples in Table 2 used a Werner & Pfleiderer ZSK 25 with an L/D ratio of 42. The resistance measurements were carried out to ISO 3915-1981 on round extrudates.

Figure 2:
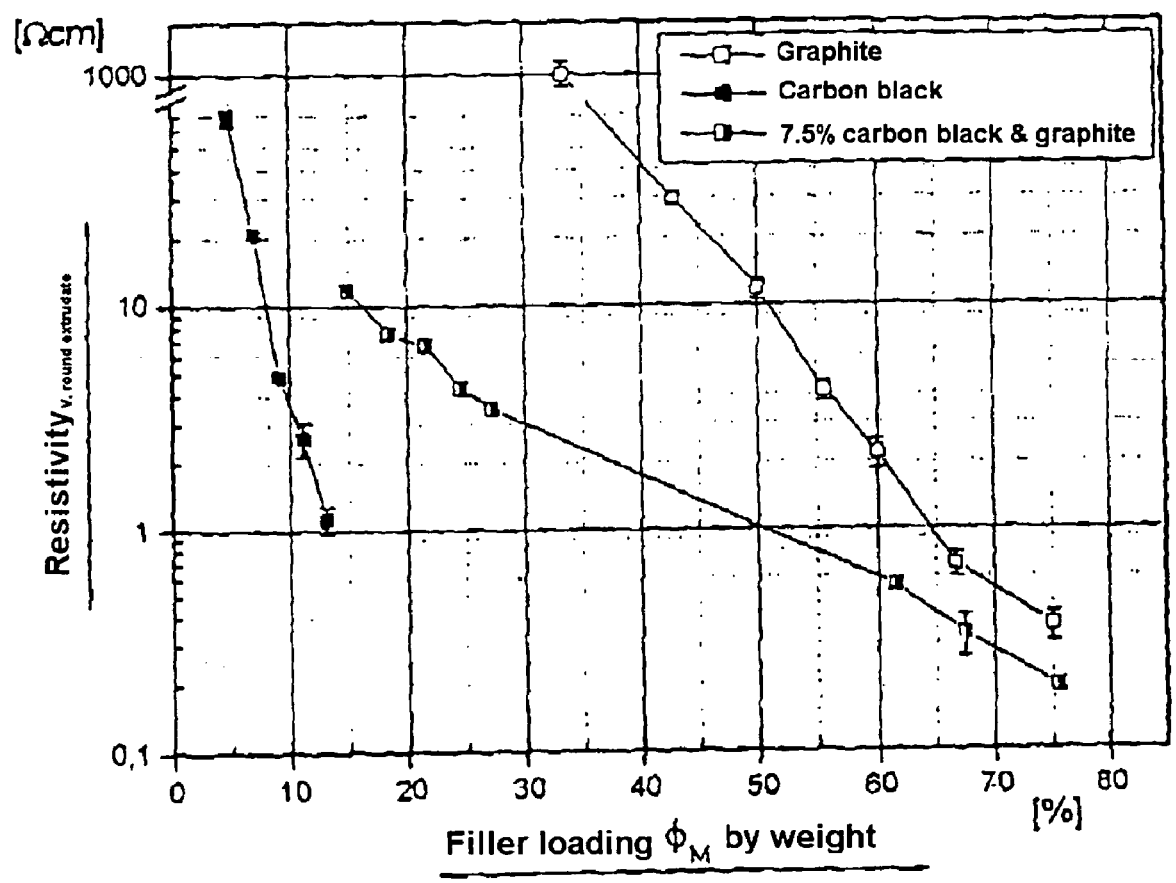

The results from Table 1 are shown graphically in FIG. 1, and the results from Table 2 in FIG. 2, plotted on a semilogarithmic scale.

TABLE 1

| | Filler loading φM/% | Resistivity RD/Ω cm | Density/ g/ml |
|---|---|---|---|
| Carbon black | | | |
| Comparative Example 1 | 4.76 | 68.45 | 1.33 |
| Comparative Example 2 | 6.98 | 20.67 | 1.3 |
| Comparative Example 3 | 9.09 | 4.87 | 1.27 |
| Comparative Example 4 | 11.11 | 2.59 | 1.24 |
| Comparative Example 5 | 13.04 | 1.12 | 1.21 |
| Graphite | | | |
| Comparative Example 6 | 33.33 | 999.72 | 1.68 |
| Comparative Example 7 | 42.86 | 29.33 | 1.76 |
| Comparative Example 8 | 50 | 11.82 | 1.82 |
| Comparative Example 9 | 55.56 | 4.16 | 1.87 |
| Comparative Example 10 | 60 | 2.18 | 1.9 |
| Comparative Example 11 | 66.67 | 0.67 | 1.96 |
| Comparative Example 12 | 75 | 0.36 | 2.03 |
| Carbon black/graphite | | | |
| Example 13 | 14.89 | 11.77 | 1.39 |
| Example 14 | 18.37 | 7.59 | 1.42 |
| Example 15 | 21.57 | 6.69 | 1.46 |
| Example 16 | 24.53 | 4.34 | 1.49 |
| Example 17 | 27.28 | 3.49 | 1.51 |
| Example 18 | 61.47 | 0.35 | 1.86 |
| Example 19 | 67.48 | 0.25 | 1.93 |
| Example 20 | 75.46 | 0.19 | 1.99 |

TABLE 2

| | Filler loading φM/% | Resistivity RD/Ω cm | Density/g/ml |
|---|---|---|---|
| Carbon black | | | |
| Comparative Example 21 | 4.76 | 137.12 | 1.34 |
| Comparative Example 22 | 6.98 | 22.94 | 1.3 |
| Comparative Example 23 | 9.09 | 4.01 | 1.28 |
| Comparative Example 24 | 11.11 | 2.86 | 1.24 |
| Comparative Example 25 | 13.04 | 1.53 | 1.21 |
| Graphite | | | |
| Comparative Example 26 | 33.33 | 1021 | 1.68 |
| Comparative Example 27 | 50 | 13.42 | 1.83 |
| Comparative Example 28 | 60 | 2.49 | 1.9 |
| Comparative Example 29 | 67 | 1.24 | 1.97 |
| Comparative Example 30 | 75 | 0.6 | 2.04 |
| Zinc | | | |
| Comparative Example 31 | 78.57 | 575.12 | 2.64 |
| Comparative Example 32 | 80 | 266.45 | 2.67 |
| Comparative Example 33 | 81.25 | 0.72 | 2.69 |
| Comparative Example 34 | 82.35 | 0.01 | 2.71 |
| Comparative Example 35 | 83.33 | 0.005 | 2.72 |
| Carbon black/graphite | | | |
| Example 36 | 14.89 | 14.68 | 1.39 |
| Example 37 | 21.57 | 7.5 | 1.46 |
| Example 38 | 27.28 | 3.55 | 1.51 |
| Example 39 | 40.29 | 2.12 | 1.64 |
| Example 40 | 51.81 | 1.29 | 1.76 |
| Example 41 | 71.83 | 0.136 | 1.98 |
| Example 42 | 75.31 | 0.086 | 2.01 |
| Example 43 | 76.74 | 0.077 | 2.03 |
| Carbon black/zinc | | | |
| Example 44 | 51.22 | 361.41 | 2.17 |
| Example 45 | 60.78 | 85.77 | 2.33 |
| Example 46 | 75.3 | 0.04 | 2.58 |
| Example 47 | 80.19 | 0.01 | 2.66 |
| Example 48 | 81.13 | 0.002 | 2.68 |

The volume resistivities given in the examples and comparative examples above were determined on the round extrudates which emerged from the die of the compounding assembly. Depending on the pressure level during the production of bipolar plates, there is a reduction in these values by a factor of from about 5 to 20 in the case of the carbon black/graphite molding compositions. This is attributable to effects of compacting the material and by their properties (non-Newtonian flow behavior with yield point), since cracks can be observed to form on emergence from the die, and this increases resistivity. This is clear from the resistivities of bipolar plates produced from molding compositions of Examples 41 and 43. These are listed as Examples 49 and 50 in Table 3.

TABLE 3

| Example | Mass flow of polymer/ kg/h | Mass flow of carbon black/ kg/h | Mass flow of graphite/ kg/h | Resistivity of compound/ Ω cm | Resistivity of plate/ Ω cm |
|---|---|---|---|---|---|
| 49 | 1.425 | 0.075 | 3.75 | 0.136 | 0.0187 |
| 50 | 1.425 | 0.075 | 4.5 | 0.077 | 0.0042 |

Further molding compositions with varied carbon black contents were prepared systematically, and used for measurements on round extrudates and measurements on a bipolar plate preform.

A P300P laboratory press with positive mold from the company Collin was used to produce molded bipolar plates by compression molding. The area of the plates was 160*160 mm. The mixtures of the raw materials were heated to 300° C. in the mold, then compressed at from 100 to 250 bar for 5 min and then cooled from 300° C. to 40° C., i.e. at ~0.3° C./s, at from 50 to 125 bar during a period of 900 s.

Figure 3:
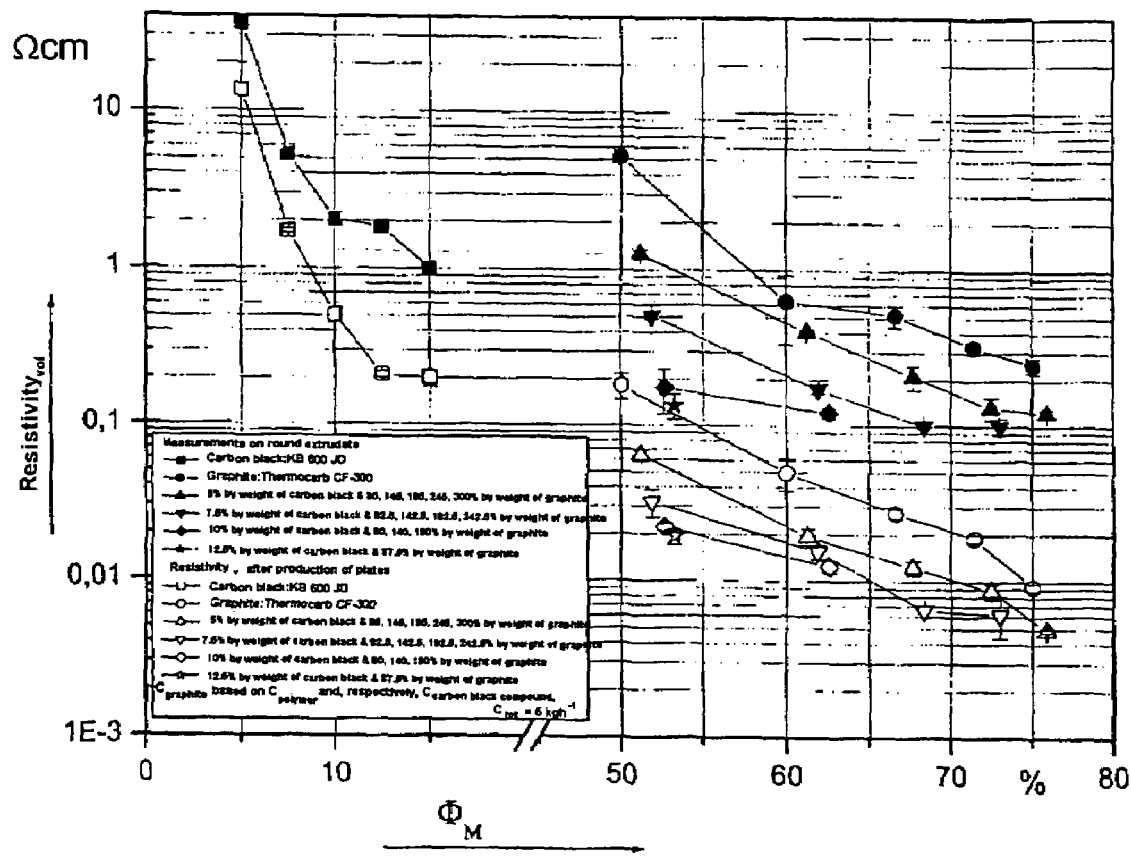
Figure 4:
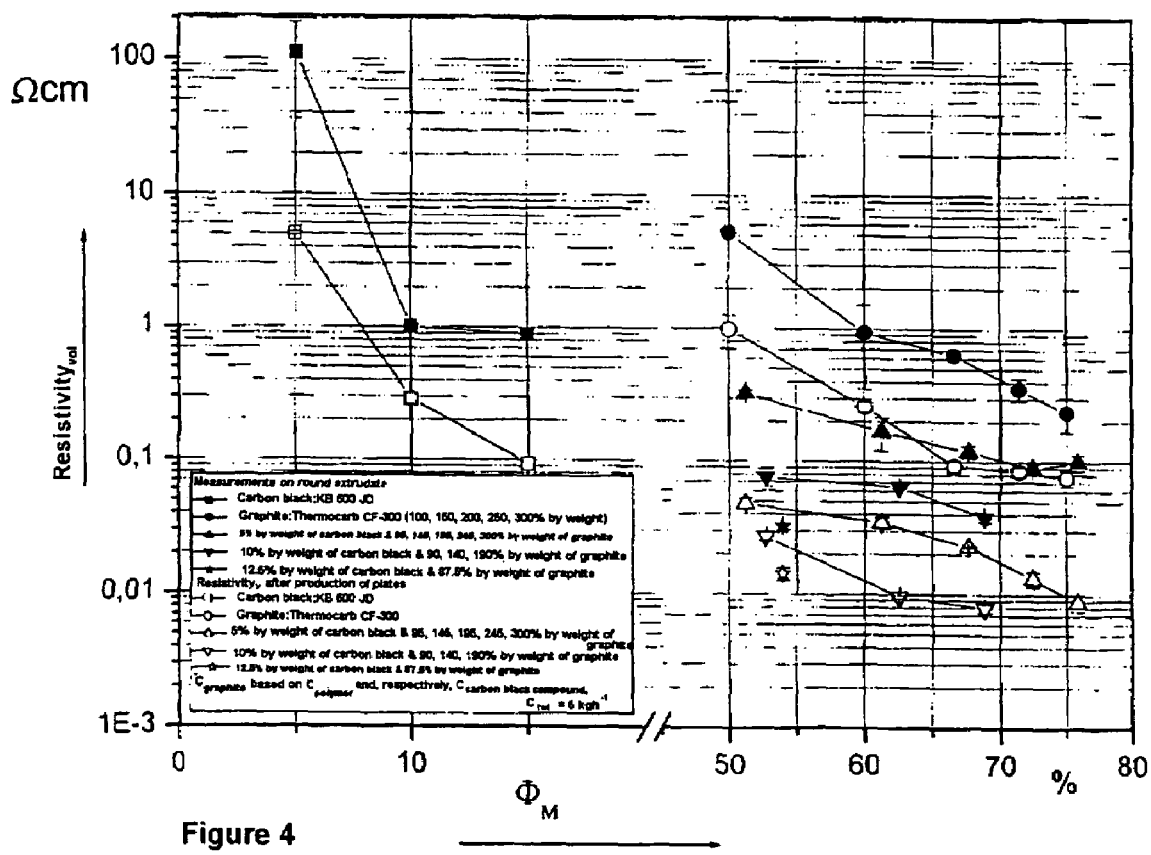

The results of measurements on liquid-crystalline plastic are listed in Table 4 and plotted on a semilogarithmic scale in FIG. 3. The results of measurements on a polyphenylene sulfide (Fortron, Ticona GmbH, Frankfurt) are listed in Table 5 and shown graphically in FIG. 4. In the comparative examples, filler loading is the same as filler content. In the case of carbon black/graphite mixtures the figure given is the carbon black content, and the filler loading was achieved by adding graphite.

TABLE 4

| | φM/% by weight | RD (round extrudate)/ Ω cm | RD (bipolar plate)/ Ω cm | Density/ g/ml |
|---|---|---|---|---|
| LCP, carbon black only | | | | |
| Comparative Example 51 | 5 | 35.49 | 13.45 | 1.42 |
| Comparative Example 52 | 7.5 | 5.24 | 1.71 | 1.43 |
| Comparative Example 53 | 10 | 2.04 | 0.51 | 1.44 |
| Comparative Example 54 | 12.5 | 1.84 | 0.21 | 1.45 |
| Comparative Example 55 | 15 | 1.00 | 0.20 | 1.46 |
| LCP, graphite only | | | | |
| Comparative Example 56 | 50 | 5.24 | 0.18 | 1.72 |
| Comparative Example 57 | 60 | 0.63 | 0.05 | 1.81 |
| Comparative Example 58 | 66.6 | 0.52 | 0.027 | 1.87 |
| Comparative Example 59 | 71.4 | 0.33 | 0.019 | 1.91 |
| Comparative Example 60 | 75 | 0.25 | 0.009 | 1.95 |
| LCP, 5% of carbon black and graphite | | | | |
| Example 61 | 51.17 | 1.26 | 0.064 | 1.71 |
| Example 62 | 61.24 | 0.40 | 0.019 | 1.80 |
| Example 63 | 67.7 | 0.21 | 0.012 | 1.86 |
| Example 64 | 72.45 | 0.13 | 0.009 | 1.92 |
| Example 65 | 75.87 | 0.12 | 0.005 | 1.95 |
| LCP, 7.5% of carbon black | | | | |

TABLE 4-continued

| | φM/% by weight | RD (round extrudate)/ Ω cm | RD (bipolar plate)/ Ω cm | Density/ g/ml |
|---|---|---|---|---|
| and Graphite | | | | |
| Example 66 | 51.9 | 0.51 | 0.032 | 1.71 |
| Example 67 | 61.89 | 0.17 | 0.016 | 1.81 |
| Example 68 | 68.365 | 0.10 | 0.007 | 1.87 |
| Example 69 | 72.99 | 0.10 | 0.006 | 1.92 |
| LCP, 10% of carbon black and Graphite | | | | |
| Example 70 | 52.66 | 0.18 | 0.022 | 1.73 |
| Example 71 | 62.66 | 0.12 | 0.012 | 1.82 |
| LCP, 12.5% of carbon black | | | | |
| Example 72 | 53.275 | 0.14 | 0.019 | 1.74 |

TABLE 5

| | φM/% by weight | RD (round extrudate)/ Ω cm | RD (bipolar plate)/Ω cm | Density/ g/ml |
|---|---|---|---|---|
| PPS, carbon black only | | | | |
| Comparative Example 73 | 5 | 111.77 | 13.45 | 1.42 |
| Comparative Example 74 | 10 | 1.00 | 1.71 | 1.43 |
| Comparative Example 75 | 15 | 0.89 | 0.51 | 1.44 |
| PPS, graphite only | | | | |
| Comparative Example 76 | 50 | 5.26 | 0.99 | 1.72 |
| Comparative Example 77 | 60 | 0.93 | 0.26 | 1.81 |
| Comparative Example 78 | 66.6 | 0.64 | 0.093 | 1.87 |
| Comparative Example 79 | 71.4 | 0.36 | 0.085 | 1.91 |
| Comparative Example 80 | 75 | 0.24 | 0.076 | 1.95 |
| PPS, 5% of carbon black and graphite | | | | |
| Example 81 | 51.17 | 0.32 | 0.048 | 1.69 |
| Example 82 | 61.24 | 0.17 | 0.035 | 1.77 |
| Example 83 | 67.7 | 0.12 | 0.023 | 1.84 |
| Example 84 | 72.45 | 0.09 | 0.013 | 1.90 |
| Example 85 | 75.87 | 0.10 | 0.009 | 1.94 |
| PPS, 10% of carbon black and graphite | | | | |
| Example 86 | 52.66 | 0.08 | 0.027 | 1.70 |
| Example 87 | 62.56 | 0.06 | 0.01 | 1.78 |
| Example 88 | 68.86 | 0.04 | 0.008 | 1.85 |
| PPS, 15% of carbon black and graphite | | | | |
| Example 89 | 53.93 | 0.03 | 0.014 | 1.70 |

The effect of the median graphite particle size on the resultant electrical resistance values is shown by FIGS. 5, 6, and 7. The values measured on bipolar plates are given in Table 6 and FIG. 5. The process parameters were exactly identical, and the only variation consisted in the particle size of the graphite filler (FIGS. 6 and 7). Use was made of what is known as a standard graphite Thermocarb CF-300 with a median particle size (FIG. 6) of ~130 μm and of what is known as a micronized graphite Thermocarb CF-300 with a median particle size (FIG. 7) of ~10 μm. It is very apparent that the volume resistivities achievable using standard graphite are markedly lower. In addition, the conductivity gain when utilizing binary carbon black/graphite filler systems here becomes clear.

A P300P laboratory press with positive mold from the company Collin was used to produce molded bipolar plates by compression moldings. The area of the plates was 160*160 mm. The mixtures of the raw materials were heated to 300° C. in the mold, then compressed at from 100 to 250 bar for 5 min and then cooled from 300° C. to 40° C., i.e. at ~0.3° C./s, at from 50 to 125 bar during a period of 900 s.

The column "Constitution" in Tables 6 to 10 is to be interpreted as follows:

The total of the proportions by weight of plastic (LCP or PPS) and carbon black (CB) is always 100%. LCPIR-5/G-195 therefore denotes a mixture of 95% by weight of LCP, 5% by weight of carbon black, and 195% by weight of graphite (G). The filler loading by weight φM is calculated as follows: φM=(weight of carbon black+weight of graphite)/(weight of plastic+weight of carbon black+weight of graphite).

TABLE 6

| | Constitution | φM/% by weight | Resistivity RD/Ω cm |
|---|---|---|---|
| LCP, Standard Graphite CF-300 | | | |
| Comparative Example 90 | LCP/R-0/G-300 | 75 | 0.0043 |
| Comparative Example 91 | LCP/R-0/G-250 | 71.4 | 0.0048 |
| Comparative Example 92 | LCP/R-0/G-200 | 66.6 | 0.0065 |
| Comparative Example 93 | LCP/R-0/G-150 | 60 | 0.0105 |
| Comparative Example 94 | LCP/R-0/G-100 | 50 | 0.0277 |
| Example 95 | LCP/R-5/G-295 | 75.87 | 0.0028 |
| Example 96 | LCP/R-5/G-245 | 72.45 | 0.0033 |
| Example 97 | LCP/R-5/G-195 | 67.7 | 0.0045 |
| Example 98 | LCP/R-5/G-145 | 61.24 | 0.0063 |
| Example 99 | LCP/R-5/G-95 | 51.17 | 0.0127 |
| Example 100 | LCP/R-7.5/G-267.5 | 74.48 | 0.0034 |
| Example 101 | LCP/R-7.5/G-242.5 | 72.99 | 0.0035 |
| Example 102 | LCP/R-7.5/G-192.5 | 68.37 | 0.0041 |
| Example 103 | LCP/R-7.5/G-142.5 | 61.89 | 0.0060 |
| Example 104 | LCP/R-7.5/G-92.5 | 51.9 | 0.0095 |
| Example 105 | LCP/R-10/G-190 | 68.96 | — |
| Example 106 | LCP/R-10/G-140 | 62.56 | 0.0056 |
| Example 107 | LCP/R-10/G-90 | 52.66 | 0.0075 |
| Example 108 | LCP/R-12.5/G-87.5 | 53.28 | 0.0073 |
| LCP, Micronized graphite CF-300 | | | |
| Comparative Example 109 | LCP/R-0/G-400 | 80 | 0.0050 |
| Comparative Example 110 | LCP/R-0/G-375 | 78.95 | 0.0055 |
| Comparative Example 111 | LCP/R-0/G-350 | 77.78 | 0.0068 |
| Comparative Example 112 | LCP/R-0/G-325 | 76.47 | 0.0075 |
| Comparative Example 113 | LCP/R-0/G-300 | 75 | 0.0086 |
| Comparative Example 114 | LCP/R-0/G)-250 | 71.4 | 0.0110 |
| Comparative Example 115 | LCP/R-0/G-200 | 66.6 | 0.0160 |
| Comparative Example 116 | LCP/R-0/G-150 | 60 | 0.0308 |
| Comparative Example 117 | LCP/R-0/G-100 | 50 | 0.0865 |
| Example 118 | LCP/R-5/G-295 | 75.87 | 0.0066 |
| Example 119 | LCP/R-5/G-245 | 72.45 | 0.0083 |
| Example 120 | LCP/R-5/G-195 | 67.7 | 0.0118 |
| Example 121 | LCP/R-5/G-145 | 61.24 | 0.0169 |
| Example 122 | LCP/R-5/G-95 | 51.17 | 0.0392 |
| Example 123 | LCP/R-7.5/G-267.5 | 74.48 | 0.0053 |
| Example 124 | LCP/R-7.5/G-242.5 | 72.99 | 0.0073 |
| Example 125 | LCP/R-7.5/G-192.5 | 68.37 | 0.0103 |
| Example 126 | LCP/R-7.5/G-142.5 | 61.89 | 0.0139 |
| Example 127 | LCP/R-7.5/G-92.5 | 51.9 | 0.0295 |
| Example 128 | LCP/R-10/G-190 | 68.96 | 0.0071 |
| Example 129 | LCP/R-10/G-140 | 62.56 | 0.0105 |
| Example 130 | LCP/R-10/G-90 | 52.66 | 0.0194 |
| Example 131 | LCP/R-12.5/G-87.5 | 53.28 | — |

Figure 9:
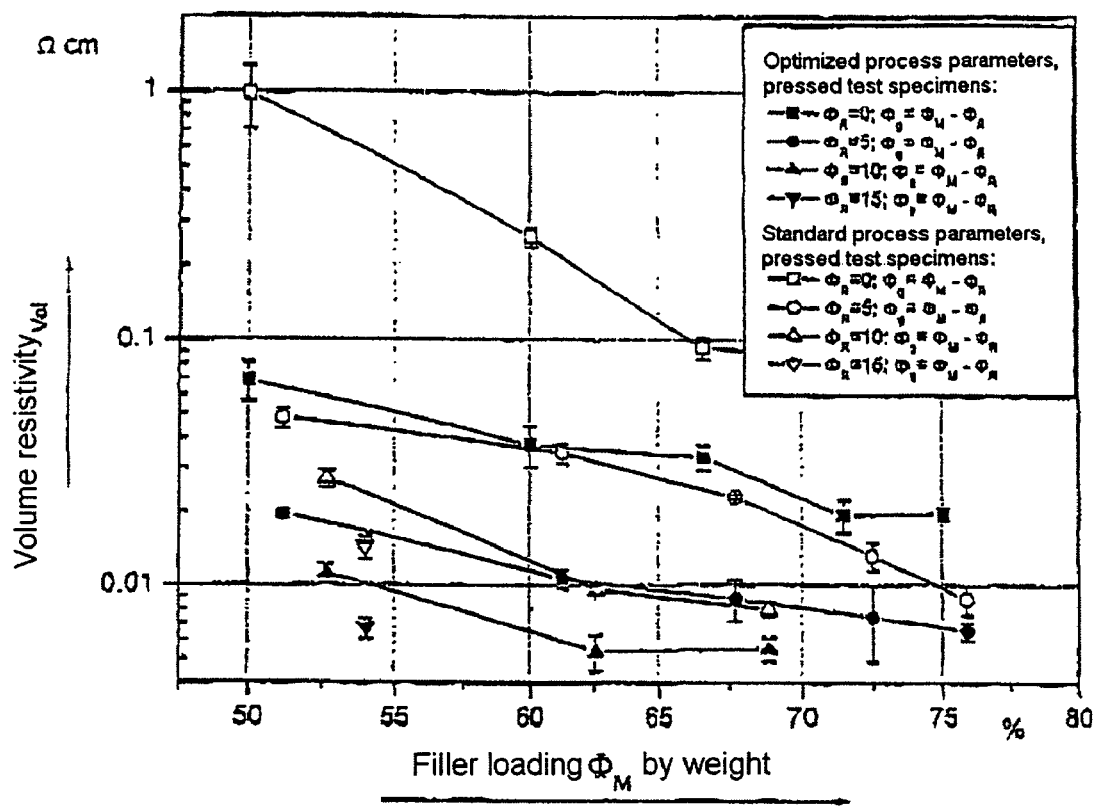

The effect of preparation parameters and specimen homogeneity on the volume resistivities are given for LCP bipolar plates in FIG. 8 and Table 7, and those for PPS bipolar plates are given in FIG. 9 and Table 8.

A P300P laboratory press with positive mold from the company Collin was used to produce molded bipolar plates by compression molding. The area of the plates was 160*160 mm. The mixtures of the raw materials were heated to 300° C. in the mold, then compressed at from 100 to 250 bar for 5 min and then cooled to 40° C. at 0.3° C./s, at from 50 to 125 bar.

The substantial process-technology difference between "standard preparation" and "optimized preparation" can be found in the design of the screws. The latter screw configuration comprises, after the graphite filler feed(s), conveying elements with 2× change in axial compression, and includes few or no functional elements (mixing elements and kneading elements).

The granular material for the compression-molding of the molded plates in the "optimized preparation" version was moreover ground, using a jaw crusher, prior to the shaping step, and fractionated, using a 1000 μm sieve, in order to ensure that the bipolar plates had better homogeneity. This improves not only mechanical but also electrical properties, because firstly no grain boundaries remain in the test specimen and secondly polymer-coated fillers (in particular graphite) are fragmented.

It is apparent not only for LCP bipolar plates but also for PPS bipolar plates, that firstly non-aggressive preparation ensures that volume resistivities are lower and secondly that the material forming an initial charge to generate the component in the cavity has to have maximum homogeneity, i.e. should preferably not be in the form of granular material but in the form of a unitary preform when introduced into the shaping unit "in a single shot", preferably "without reheating".

TABLE 7

| | Constitution | φM/% by weight | Resistivity RD/Ω cm |
|---|---|---|---|
| LCP, Standard Graphite CF-300 Optimized preparation | | | |
| Comparative Example 132 | LCP/R-0/G-300 | 75 | 0.0043 |
| Comparative Example 133 | LCP/R-0/G-250 | 71.4 | 0.0048 |
| Comparative Example 134 | LCP/R-0/G-200 | 66.6 | 0.0065 |
| Comparative Example 135 | LCP/R-0/G-150 | 60 | 0.0105 |
| Comparative Example 136 | LCP/R-0/G-100 | 50 | 0.0277 |
| Example 137 | LCP/R-5/G-295 | 75.87 | 0.0028 |
| Example 138 | LCP/R-5/G-245 | 72.45 | 0.0033 |
| Example 139 | LCP/R-5/G-195 | 67.7 | 0.0045 |
| Example 140 | LCP/R-5/G-145 | 61.24 | 0.0062 |
| Example 141 | LCP/R-5/G-95 | 51.17 | 0.0127 |
| Example 142 | LCP/R-7.5/G-267.5 | 74.48 | 0.0034 |
| Example 143 | LCP/R-7.5/G-242.5 | 72.99 | 0.0035 |
| Example 144 | LCP/R-7.5/G-192.5 | 68.37 | 0.0041 |
| Example 145 | LCP/R-7.5/G-142.5 | 61.89 | 0.0060 |
| Example 146 | LCP/R-7.5/G-92.5 | 51.9 | 0.0095 |
| Example 147 | LCP/R-10/G-190 | 68.96 | — |
| Example 148 | LCP/R-10/G-140 | 62.56 | 0.0056 |
| Example 149 | LCP/R-10/G-90 | 52.66 | 0.0075 |
| Example 150 | LCP/R-12.5/G-87.5 | 53.28 | 0.0073 |
| LCP, Standard graphite CF-300 Standard preparation | | | |
| Comparative Example 151 | LCP/R-0/G-300 | 75 | 0.0093 |
| Comparative Example 152 | LCP/R-0/G-250 | 71.4 | 0.0190 |
| Comparative Example 153 | LCP/R-0/G-200 | 66.6 | 0.0275 |
| Comparative Example 154 | LCP/R-0/G-150 | 60 | 0.0497 |
| Comparative Example 155 | LCP/R-0/G-100 | 50 | 0.1819 |
| Example 156 | LCP/R-5/G-295 | 75.87 | 0.0049 |
| Example 157 | LCP/R-5/G-245 | 72.45 | 0.0087 |
| Example 158 | LCP/R-5/G-195 | 67.7 | 0.0122 |
| Example 159 | LCP/R-5/G-145 | 61.24 | 0.0195 |
| Example 160 | LCP/R-5/G-95 | 51.17 | 0.0642 |

TABLE 7-continued

| | Constitution | φM/% by weight | Resistivity RD/Ω cm |
|---|---|---|---|
| Example 161 | LCP/R-7.5/G-267.5 | 74.48 | — |
| Example 162 | LCP/R-7.5/G-242.5 | 72.99 | 0.0062 |
| Example 163 | LCP/R-7.5/G-192.5 | 68.37 | 0.0066 |
| Example 164 | LCP/R-7.5/G-142.5 | 61.89 | 0.0155 |
| Example 165 | LCP/R-7.5/G-92.5 | 51.9 | 0.0319 |
| Example 166 | LCP/R-10/G-190 | 68.96 | — |
| Example 167 | LCP/R-10/G-140 | 62.56 | 0.0124 |
| Example 168 | LCP/R-10/G-90 | 52.66 | 0.0221 |
| Example 169 | LCP/R-12.5/G-87.5 | 53.28 | 0.0194 |

TABLE 8

| | Constitution | φM/% by weight | Resistivity RD/Ω cm |
|---|---|---|---|
| PPS, Standard Graphite CF-300 Optimized preparation | | | |
| Example 170 | PPS/R-15/G-85 | 53.93 | 0.0067 |
| Example 171 | PPS/R-10/G-190 | 68.86 | 0.0055 |
| Example 172 | PPS/R-10/G-140 | 62.56 | 0.0053 |
| Example 173 | PPS/R-10/G-90 | 52.66 | 0.0112 |
| Example 174 | PPS/R-5/G-295 | 75.87 | 0.0065 |
| Example 175 | PPS/R-5/G-245 | 72.45 | 0.0074 |
| Example 176 | PPS/R-5/G-195 | 67.7 | 0.0088 |
| Example 177 | PPS/R-5/G-145 | 61.24 | 0.0106 |
| Example 178 | PPS/R-5/G-95 | 51.17 | 0.0196 |
| Comparative Example 179 | PPS/R-0/G-300 | 75 | 0.0198 |
| Comparative Example 180 | PPS/R-0/G-250 | 71.4 | 0.0193 |
| Comparative Example 181 | PPS/R-0/G-200 | 66.6 | 0.0332 |
| Comparative Example 182 | PPS/R-0/G-150 | 60 | 0.0372 |
| Comparative Example 183 | PPS/R-0/G-100 | 50 | 0.0685 |
| PPS, Standard Graphite CF-300 Standard preparation | | | |
| Example 184 | PPS/R-15/G-85 | 53.93 | 0.0142 |
| Example 185 | PPS/R-10/G-190 | 68.86 | 0.0080 |
| Example 186 | PPS/R-10/G-140 | 62.56 | 0.0096 |
| Example 187 | PPS/R-10/G-90 | 52.66 | 0.0271 |
| Example 188 | PPS/R-5/G-295 | 75.87 | 0.0088 |
| Example 189 | PPS/R-5/G-245 | 72.45 | 0.0132 |
| Example 190 | PPS/R-5/G-195 | 67.7 | 0.0229 |
| Example 191 | PPS/R-5/G-145 | 61.24 | 0.0346 |
| Example 192 | PPS/R-5/G-95 | 51.17 | 0.0481 |
| Comparative Example 193 | PPS/R-0/G-300 | 75 | 0.0762 |
| Comparative Example 194 | PPS/R-0/G-250 | 71.4 | 0.0849 |
| Comparative Example 195 | PPS/R-0/G-200 | 66.6 | 0.0932 |
| Comparative Example 196 | PPS/R-0/G-150 | 60 | 0.2602 |
| Comparative Example 197 | PPS/R-0/G-100 | 50 | 0.9852 |

Figure 10:
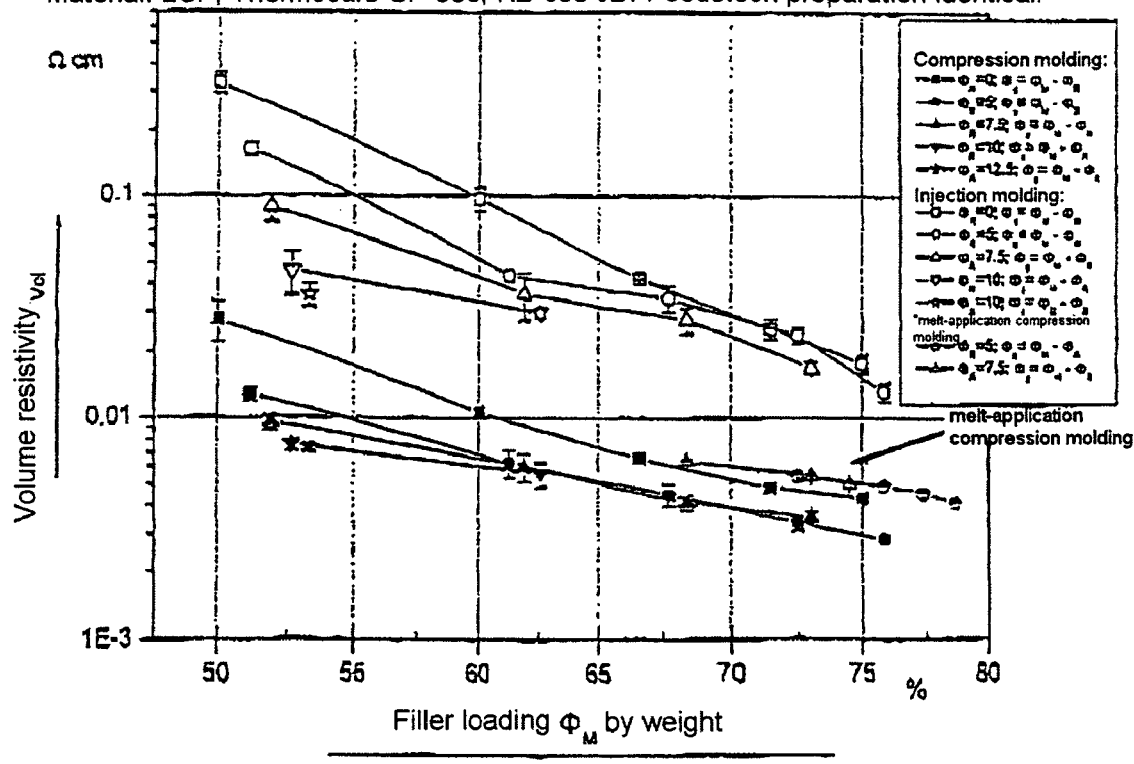
Figure 11:
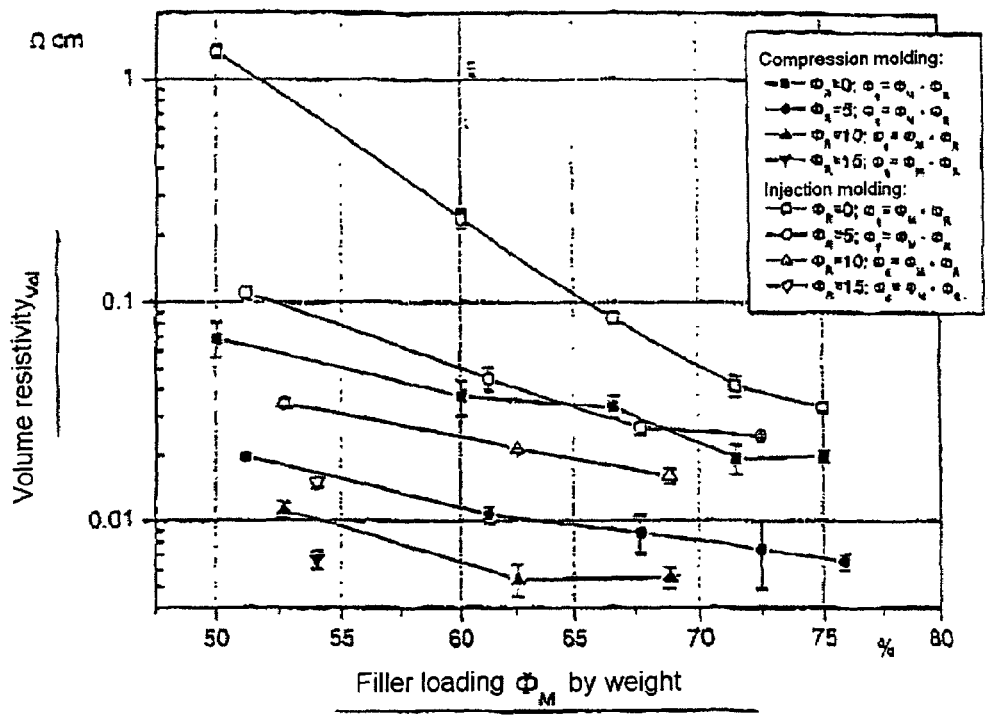

The effect of the processing on the volume resistivity is shown in FIG. 10 for LCP formulations and in FIG. 11 for PPS formulations. The values measured are given in Tables 9 and 10.

To produce test plates by compression molding, the process parameters used were the same as those for production of molded bipolar plates (Table 7 & 8). For the injection molding process, use was made of machines from the company Arburg (Allrounder) and Krauss-Maffei. The processing recommendations for Vectra (LCP) and Fortron (PPS) in the product brochures from Ticona GmbH were heeded. To produce test plates via melt-application compression molding, a P300P laboratory press with positive mold from the company Collin was supplied directly with the melt extrudate emerging from an extruder (ZSK 25 from the company Werner & Pfleiderer). The area of the plate was 160*160 mm. The melt extrudate temperature was from 300 to 320° C., and the temperature of the cavity of the press was 300° C. The melt was compressed at from 100 to 250 bar for 5 min and then cooled to 40° C. at 0.3° C./s at from 50 to 125 bar.

Figure 12:
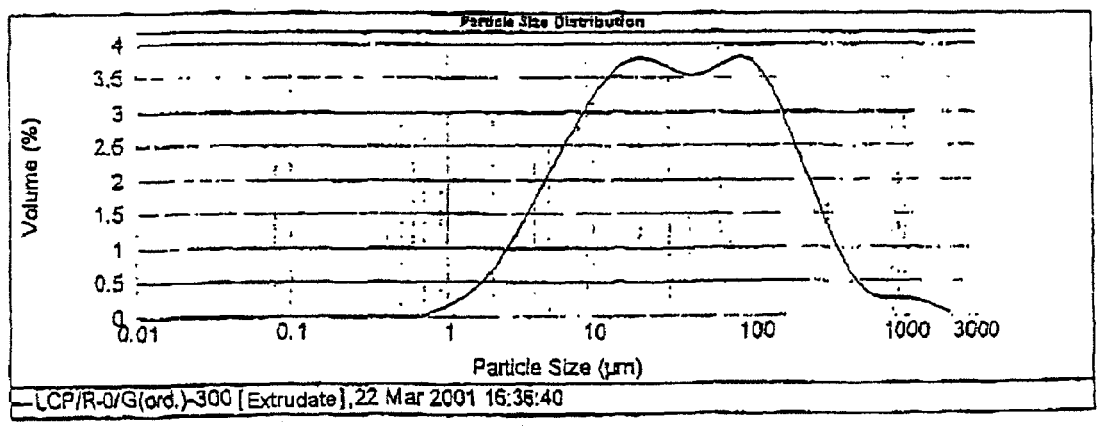
Figure 13:
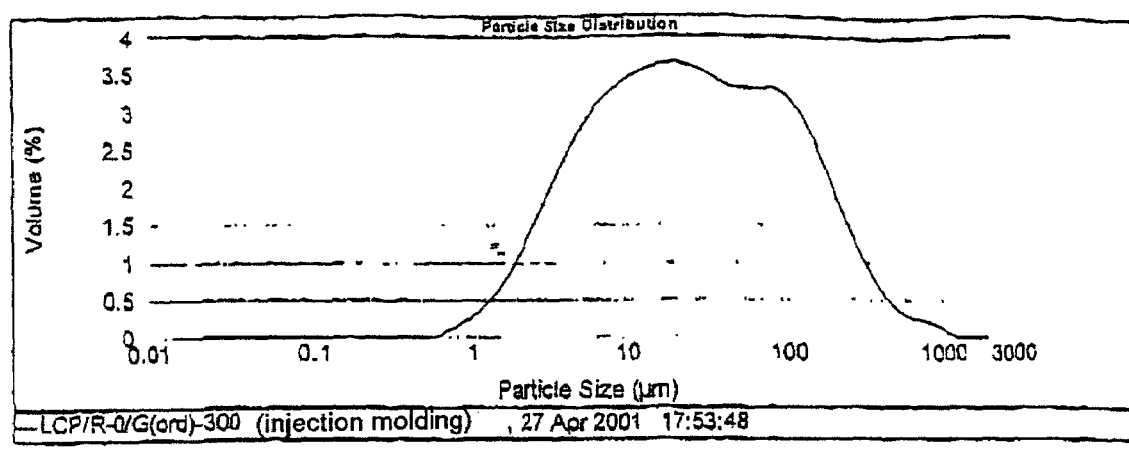

It is apparent for both materials, LCP and PPS, that test plates produced by means of standard injection molding have substantially higher volume resistivities than compression-molded test specimens. The values measured for the specimens produced by melt-application compression molding, in this case of flat-extrudate sections, into a compression molding cavity are somewhat poorer than those for compression molding (FIG. 10). From FIGS. 12 and 13 it is seen that the resumption of shear-energy-induced melting in the plastifying assembly of the injection molding machine—and in particular the shear processes and deformation processes during injection of the plastifed mass into the cavity, causes damage to the graphite particles, whereas this is not to be found during compression molding or melt-application compression molding or injection-compression molding, and in particular not during processes of this type which proceed in a single stage.

TABLE 9

| | Constitution | φM/% by weight | Resistivity RD/Ω cm |
|---|---|---|---|
| LCP, Standard Graphite CF-300 Compression molding | | | |
| Comparative Example 198 | LCP/R-0/G-300 | 75 | 0.0043 |
| Comparative Example 199 | LCP/R-0/G-250 | 71.4 | 0.0048 |
| Comparative Example 200 | LCP/R-0/G-200 | 66.6 | 0.0065 |
| Comparative Example 201 | LCP/R-0/G-150 | 60 | 0.0105 |
| Comparative Example 202 | LCP/R-0/G-100 | 50 | 0.0277 |
| Example 203 | LCP/R-5/G-295 | 75.87 | 0.0028 |
| Example 204 | LCP/R-5/G-245 | 72.45 | 0.0033 |
| Example 205 | LCP/R-5/G-195 | 67.7 | 0.0045 |
| Example 206 | LCP/R-5/G-145 | 61.24 | 0.0063 |
| Example 207 | LCP/R-5/G-95 | 51.17 | 0.0127 |
| Example 208 | LCP/R-7.5/G-267.5 | 74.48 | 0.0034 |
| Example 209 | LCP/R-7.5/G-242.5 | 72.99 | 0.0035 |
| Example 210 | LCP/R-7.5/G-192.5 | 68.37 | 0.0041 |
| Example 211 | LCP/R-7.5/G-142.5 | 61.89 | 0.0060 |
| Example 212 | LCP/R-7.5/G-92.5 | 51.9 | 0.0095 |
| Example 213 | LCP/R-10/G-140 | 62.56 | 0.0056 |
| Example 214 | LCP/R-10/G-90 | 52.66 | 0.0075 |
| Example 215 | LCP/R-12.5/G-87.5 | 53.28 | 0.0073 |
| Example 216 | LCP/R-5/G-0 | 5 | 13.45 |
| Example 217 | LCP/R-7.5/G-0 | 7.5 | 1.71 |
| Example 218 | LCP/R-10/G-0 | 10 | 0.51 |
| Example 219 | LCP/R-12.5/G-0 | 12.5 | 0.21 |
| LCP, Standard graphite CF-300 Injection molding | | | |
| Comparative Example 220 | LCP/R-0/G-300 | 75 | 0.0177 |
| Comparative Example 221 | LCP/R-0/G-250 | 71.4 | 0.0252 |
| Comparative Example 222 | LCP/R-0/G-200 | 66.6 | 0.0427 |
| Comparative Example 223 | LCP/R-0/G-150 | 60 | 0.0970 |
| Comparative Example 224 | LCP/R-0/G-100 | 50 | 0.3285 |
| Example 225 | LCP/R-5/G-295 | 75.87 | 0.0131 |
| Example 226 | LCP/R-5/G-245 | 72.45 | 0.0235 |
| Example 227 | LCP/R-5/G-195 | 67.7 | 0.0347 |
| Example 228 | LCP/R-5/G-145 | 61.24 | 0.0439 |
| Example 229 | LCP/R-5/G-95 | 51.17 | 0.1652 |
| Example 230 | LCP/R-7.5/G-267.5 | 72.99 | 0.0168 |
| Example 231 | LCP/R-7.5/G-242.5 | 68.37 | 0.0279 |
| Example 232 | LCP/R-7.5/G-192.5 | 61.89 | 0.0363 |
| Example 233 | LCP/R-7.5/G-142.5 | 51.9 | 0.0889 |
| Example 234 | LCP/R-7.5/G-92.5 | | |
| Example 235 | LCP/R-10/G-140 | 62.56 | 0.0299 |
| Example 236 | LCP/R-10/G-90 | 52.66 | 0.0459 |
| Example 237 | LCP/R-12.5/G-87.5 | 53.28 | 0.0357 |
| Example 238 | LCP/R-5/G-0 | 5 | 3.76 |
| Example 239 | LCP/R-7.5/G-0 | 7.5 | 1.77 |
| Example 240 | LCP/R-10/G-0 | 10 | 0.61 |
| Example 241 | LCP/R-12.5/G-0 | 12.5 | 0.35 |

TABLE 9-continued

| | Constitution | φM/% by weight | Resistivity RD/Ω cm |
|---|---|---|---|
| LCP Standard graphite CF-300 Melt-application compression molding | | | |
| Example 242 | LCP/R-5/G-345 | 78.65 | 0.0041 |
| Example 243 | LCP/R-5/G-320 | 77.38 | 0.0046 |
| Example 244 | LCP/R-5/G-295 | 75.87 | 0.0049 |
| Example 245 | LCP/R-5/G-245 | 72.45 | 0.0055 |
| Example 246 | LCP/R-7.5/G-267.5 | 74.48 | 0.0051 |
| Example 247 | LCP/R-7.5/G-242.5 | 72.99 | 0.0055 |
| Example 248 | LCP/R-7.5/G-192.5 | 68.37 | 0.0064 |

TABLE 10

| | Constitution | φM/% by weight | Resistivity RD/Ω cm |
|---|---|---|---|
| PPS, Standard graphite CF-300 Compression molding | | | |
| Example 249 | PPS/R-15/G-85 | 53.93 | 0.0067 |
| Example 250 | PPS/R-10/G-190 | 68.86 | 0.0055 |
| Example 251 | PPS/R-10/G-140 | 62.56 | 0.0053 |
| Example 252 | PPS/R-10/G-90 | 52.66 | 0.0112 |
| Example 253 | PPS/R-5/G-295 | 75.87 | 0.0065 |
| Example 254 | PPS/R-5/G-245 | 72.45 | 0.0074 |
| Example 255 | PPS/R-5/G-195 | 67.7 | 0.0088 |
| Example 256 | PPS/R-5/G-145 | 61.24 | 0.0106 |
| Example 257 | PPS/R-5/G-95 | 51.17 | 0.0196 |
| Comparative Example 258 | PPS/R-0/G-300 | 75 | 0.0198 |
| Comparative Example 259 | PPS/R-0/G-250 | 71.4 | 0.0193 |
| Comparative Example 260 | PPS/R-0/G-200 | 66.6 | 0.0332 |
| Comparative Example 261 | PPS/R-0/G-150 | 60 | 0.0372 |
| Comparative Example 262 | PPS/R-0/G-100 | 50 | 0.0685 |
| Comparative Example 263 | PPS/R-5/G-0 | 5 | 5.02 |
| Comparative Example 264 | PPS/R-10/G-0 | 10 | 0.29 |
| Comparative Example 265 | PPS/R-15/G-0 | 15 | 0.093 |
| PPS, Standard graphite CF-300 Injection molding | | | |
| Example 266 | PPS/R-15/G-85 | 53.93 | 0.0149 |
| Example 267 | PPS/R-10/G-190 | 68.86 | 0.0159 |
| Example 268 | PPS/R-10/G-140 | 62.56 | 0.0214 |
| Example 269 | PPS/R-10/G-90 | 52.66 | 0.0347 |
| Comparative Example 270 | PPS/R-5/G-295 | 75.87 | |
| Comparative Example 271 | PPS/R-5/G-245 | 72.45 | 0.0246 |
| Comparative Example 272 | PPS/R-5/G-195 | 67.7 | 0.0266 |
| Comparative Example 273 | PPS/R-5/G-145 | 61.24 | 0.0449 |
| Comparative Example 274 | PPS/R-5/G-95 | 51.17 | 0.1099 |
| Comparative Example 275 | PPS/R-0/G-300 | 75 | 0.0331 |
| Comparative Example 276 | PPS/R-0/G-250 | 71.4 | 0.0419 |
| Comparative Example 277 | PPS/R-0/G-200 | 66.6 | 0.0848 |
| Comparative Example 278 | PPS/R-0/G-150 | 60 | 0.24 |
| Comparative Example 279 | PPS/R-0/G-100 | 50 | 1.34 |
| Comparative Example 280 | PPS/R-5/G-0 | 5 | 1.58 |
| Comparative Example 281 | PPS/R-10/G-0 | 10 | 0.40 |

The invention claimed is:
1. A bipolar plate, end plate, or part of an end plate of a fuel cell, comprising a liquid-crystalline plastic and a conductive molding composition based on liquid-crystalline plastic, wherein the conductive molding composition comprises, as conductive constituents,
   A) carbon black and graphite, or
   B) carbon black and metal powder, or
   C) carbon black and graphite and metal powder,
   the carbon black has a specific surface area of from 500 to 1500 m$^2$/g, and a dibutyl phthalate value of from 470 to

700 ml/l 100 g, and the graphite has a specific surface area of from 1 to 35 m$^2$/g and a median particle size of from 50 to 450 βm.

2. A process for producing a bipolar plate, endplate, or part of an endplate for fuel cells from a liquid-crystalline plastic molding composition wherein the plastic molding composition comprises, as conductive constituents,
A) carbon black and graphite, or
B) carbon black and metal powder, or
C) carbon black and graphite and metal powder,
the carbon black has a specific surface area of from 500 to 1500 m$^2$/g, and a dibutyl phthalate value of from 470 to 700 ml/100 g, and the graphite has a specific surface area of from 1 to 35 m$^2$/g and a median particle size of from 50 to 450 βm, which comprises production via compression molding.

3. The process as claimed in claim 2, wherein the plastics molding composition has been pre-ground and has particle sizes of from 1500 to 50 βm.

4. The process as claimed in claim 2, wherein the plastics molding composition has been pre-ground and has particle sizes of from 1,000 to 100 μm.

5. The process as claimed in claim 2, wherein the plastics molding composition has been pre-ground and has particle sizes of from 800 to 150 μm.

6. The molding as claimed in claim 5, wherein the molding is a bipolar plate, an end plate or a part of an end plate of a fuel cell.

7. A process for producing a bipolar plate, endplate, or part of an endplate for fuel cells from a liquid-crystalline plastic molding composition wherein the plastic molding composition comprises, as conductive constituents,
A) carbon black and graphite, or
B) carbon black and metal powder, or
C) carbon black and graphite and metal powder,
the carbon black has a specific surface area of from 500 to 1500 m$^2$/g, and a dibutyl phthalate value of from 470 to 700 ml/100 g, and the graphite has a specific surface area of from 1 to 35 m$^2$/g and a median particle size of from 50 to 450 βm, which comprises production in a single step of a process, by bringing together the compounding step and the preparation step to give a single-stage process.

8. The process as claimed in claim 7, wherein the method of production is injection-molding compounding with injection-compression molding unit.

9. The process as claimed in claim 7, wherein the method of production is melt-application compression molding.

\* \* \* \* \*

UNITED STATES PATENT AND TRADEMARK OFFICE
CERTIFICATE OF CORRECTION

PATENT NO. : 7,419,720 B2 Page 1 of 1
APPLICATION NO. : 10/471469
DATED : September 2, 2008
INVENTOR(S) : Aichim Hofmann et al.

It is certified that error appears in the above-identified patent and that said Letters Patent is hereby corrected as shown below:

In the Claims:

In Claim 1, in column 17, on line 3, "from 50 to 450 βm.", should read -- from 50 to 450 μm.--.

In Claim 2, in column 17, on line 15, "50 to 450 βm, which comprises production via compres-", should read -- 50 to 450 μm, which comprises production via compres- --.

In Claim 3, in column 17, on line 19, "sizes of from 1,000 to 50 βm.", should read -- sizes of from 1,000 to 50 μm. --.

In Claim 7, in column 18, on line 15, "50 to 450 βm, which comprises production in a single", should read -- 50 to 450 μm, which comprises production in a single --.

Signed and Sealed this

Twenty-fifth Day of November, 2008

JON W. DUDAS
*Director of the United States Patent and Trademark Office*